(12) United States Patent
Ando

(10) Patent No.: US 11,791,703 B2
(45) Date of Patent: Oct. 17, 2023

(54) ACTUATOR WITH A VISCOELASTIC CONNECTING ELEMENT

(71) Applicant: NIDEC SANKYO CORPORATION, Nagano (JP)

(72) Inventor: Masaaki Ando, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 26 days.

(21) Appl. No.: 17/494,777

(22) Filed: Oct. 5, 2021

(65) Prior Publication Data

US 2022/0123643 A1  Apr. 21, 2022

(30) Foreign Application Priority Data

Oct. 16, 2020 (JP) ................. 2020-174578

(51) Int. Cl.
  *H02K 33/18* (2006.01)
  *H04R 23/00* (2006.01)
  *G08B 6/00* (2006.01)

(52) U.S. Cl.
  CPC .............. *H02K 33/18* (2013.01); *G08B 6/00* (2013.01); *H04R 23/00* (2013.01)

(58) Field of Classification Search
  CPC ........... H02K 33/18; H04R 23/00; G08B 6/00
  See application file for complete search history.

(56) References Cited

U.S. PATENT DOCUMENTS

| 8,890,553 | B2 | 11/2014 | Furuta et al. |
| 11,108,296 | B2 | 8/2021 | Mori et al. |
| 2009/0325446 | A1* | 12/2009 | Hori ............ C08K 5/18 428/458 |
| 2020/0044541 | A1* | 2/2020 | Takeda ............ H02K 33/16 |
| 2020/0161955 | A1 | 5/2020 | Kitahara et al. |

FOREIGN PATENT DOCUMENTS

| CN | 102565133 | 7/2012 |
| CN | 110323915 | 10/2019 |
| JP | 2000123387 | 4/2000 |
| JP | 2009264483 | 11/2009 |
| JP | 2019013086 | 1/2019 |
| WO | WO-2018030267 A1 * | 2/2018 ............ B06B 1/04 |

OTHER PUBLICATIONS

"Office Action of China Counterpart Application", dated Apr. 19, 2023, with English translation thereof, pp. 1-14.

* cited by examiner

*Primary Examiner* — Tulsidas C Patel
*Assistant Examiner* — Robert E Mates
(74) *Attorney, Agent, or Firm* — JCIPRNET

(57) ABSTRACT

The actuator includes a magnetic drive mechanism to relatively move the movable body with respect to the support body. The magnetic drive mechanism has a magnet and a coil. The connecting element connected to the support body and the movable body is a viscoelastic member. The viscoelastic member has a temperature characteristic that a loss tangent (Tan δ) thereof measured by a dynamic viscoelasticity measurement decreases as a temperature rises. When using a silicone gel as the connecting element, the decrease in the peak value of the acceleration of the movable body caused by the decrease in the current flowing through the coil is cancelled by the increase in the peak value of the acceleration of the movable body caused by the decrease in Tan δ of the silicone gel. Therefore, the oscillation of the movable body is unchanged even if a temperature changes.

3 Claims, 6 Drawing Sheets

ACTUATOR WITH A VISCOELASTIC CONNECTING ELEMENT

CROSS REFERENCE TO RELATED APPLICATION

The present invention claims priority under 35 U.S.C. § 119 to Japanese Application No. 2020-174578 filed Oct. 16, 2020, and the entire content of which is incorporated herein by reference.

BACKGROUND

Field of the Invention

At least an embodiment of the present invention relates to an actuator for relatively moving a movable body with respect to a support body.

Description of the Related Documents

Conventionally, there is an actuator which is provided with a support body, a movable body, and a magnetic drive mechanism to oscillate the movable body with respect to the support body, wherein the movable body is connected to the support body by an elastic and viscoelastic connecting element. Japanese Patent Laid-open Publication No. 2019-13086 discloses an actuator in which a movable body is disposed inside a rectangular parallelepiped cover and the movable body oscillates in a longitudinal direction of the cover. A connecting element of the actuator disclosed in Japanese Patent Laid-open Publication No. 2019-13086 is a gel-like member formed in a way that cuts a sheet-like gel into a rectangular shape. The movable body includes a yoke to which a magnet is fixed, and the connecting element (i.e., the gel-like member) one side of which adheres to the yoke and the other side of which adheres to the cover member in the thickness direction of the gel-like member. The magnetic drive mechanism is provided with a magnet disposed on one of the movable body and the support, and a coil disposed on the other of the movable body and the support body.

In an actuator which employs a magnetic drive mechanism, when a temperature of the coil rises due to heat generated by energizing the coil, a resistance value of the coil increases, so that it makes a current flowing through it decrease. As a result, a peak value of an acceleration at a resonance frequency decreases, so that the driving force gets lower. Therefore, the actuator has a temperature characteristic that a vibration thereof becomes smaller as the temperature of the coil rises, and there is a problem in the conventional actuator that it is not able to produce a constant vibration when a temperature change occurs.

In light of the above mentioned problems, an object of at least an embodiment of the present invention is to suppress a change in vibration of an actuator in which a movable body moves with respect to a support body, which is caused by a change in a temperature.

SUMMARY

In order to solve the above mentioned problems, an actuator according to at least an embodiment of the present invention includes: a support body and a movable body; a connecting element connected to the support body and the movable body; and a magnetic drive mechanism including a magnet and a coil, to cause the movable body to relatively move with respect to the support body, wherein the connecting element is a viscoelastic member, and provided that Tan δ is a loss tangent of the viscoelastic member measured by a dynamic viscoelasticity measurement, the Tan δ of the viscoelastic member decreases as a temperature rises.

In the at least an embodiment of the present invention, the loss tangent (Tan δ) of the connecting element connecting the movable body and the support body, which is measured by a dynamic viscoelasticity measurement, decreases as a temperature rises. The decrease in the Tan δ means that the elasticity contributes more than the viscosity. When the connecting element has such a temperature characteristic, the current flowing through the coil decreases due to a temperature rising and a peak value of an acceleration decreases, while a peak value of an acceleration increases in accordance with the temperature characteristic of the connecting element (i.e., a decrease in Tan δ as the temperature rises), so that the decrease in the acceleration of the movable body is suppressed. Accordingly, since a change in the acceleration of the movable body due to the temperature change can be suppressed, a change in the oscillation of the movable body due to the temperature change can be suppressed.

In the at least an embodiment of the present invention, when the movable body oscillates at a resonance frequency, a decrease in a peak value of an acceleration of the movable body, which is caused by a decrease in a current flowing through the coil, is preferably cancelled by an increase in the peak value, which is caused by a decrease in the Tan δ of the viscoelastic member. In this way, the acceleration of the movable body does not change even when the temperature changes, so that it is possible to cause the movable body to oscillate in a constant manner even when the temperature changes.

In the at least an embodiment of the present invention, the viscoelastic member is a silicone gel. The silicone gel has a temperature characteristic that the loss tangent (Tan δ) thereof, which is measured by dynamic viscoelasticity, decreases as the temperature rises. Therefore, a use of the silicone gel allows a change in the oscillation of the movable body due to the temperature change to be suppressed.

In the at least an embodiment of the present invention, the connecting element is preferably disposed at a position where the support body and the movable body face each other in a first direction, and the movable body preferably oscillates in a second direction that intersects the first direction. In the configuration where the viscoelastic member deforms in the shear direction, the viscoelastic member has a deformation characteristic where a linear component is larger than a nonlinear component. Therefore, it is possible to obtain an oscillation characteristic with good linearity.

According to the at least an embodiment of the present invention, the loss tangent (Tan δ) of the connecting element connecting the movable body and the support body, which is measured by a dynamic viscoelasticity measurement, decreases as a temperature rises. The decrease in the Tan δ means that the elasticity contributes more than the viscosity. When the connecting element has such a temperature characteristic, the current flowing through the coil decreases due to a temperature rising and a peak value of an acceleration decreases, while a peak value of an acceleration increases in accordance with the temperature characteristic of the connecting element (i.e., a decrease in Tan δ as the temperature rises), so that the decrease in the acceleration of the movable body is suppressed. Accordingly, since a change in the acceleration of the movable body due to the temperature change can be suppressed, a change in the oscillation of the movable body due to the temperature change can be suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1:
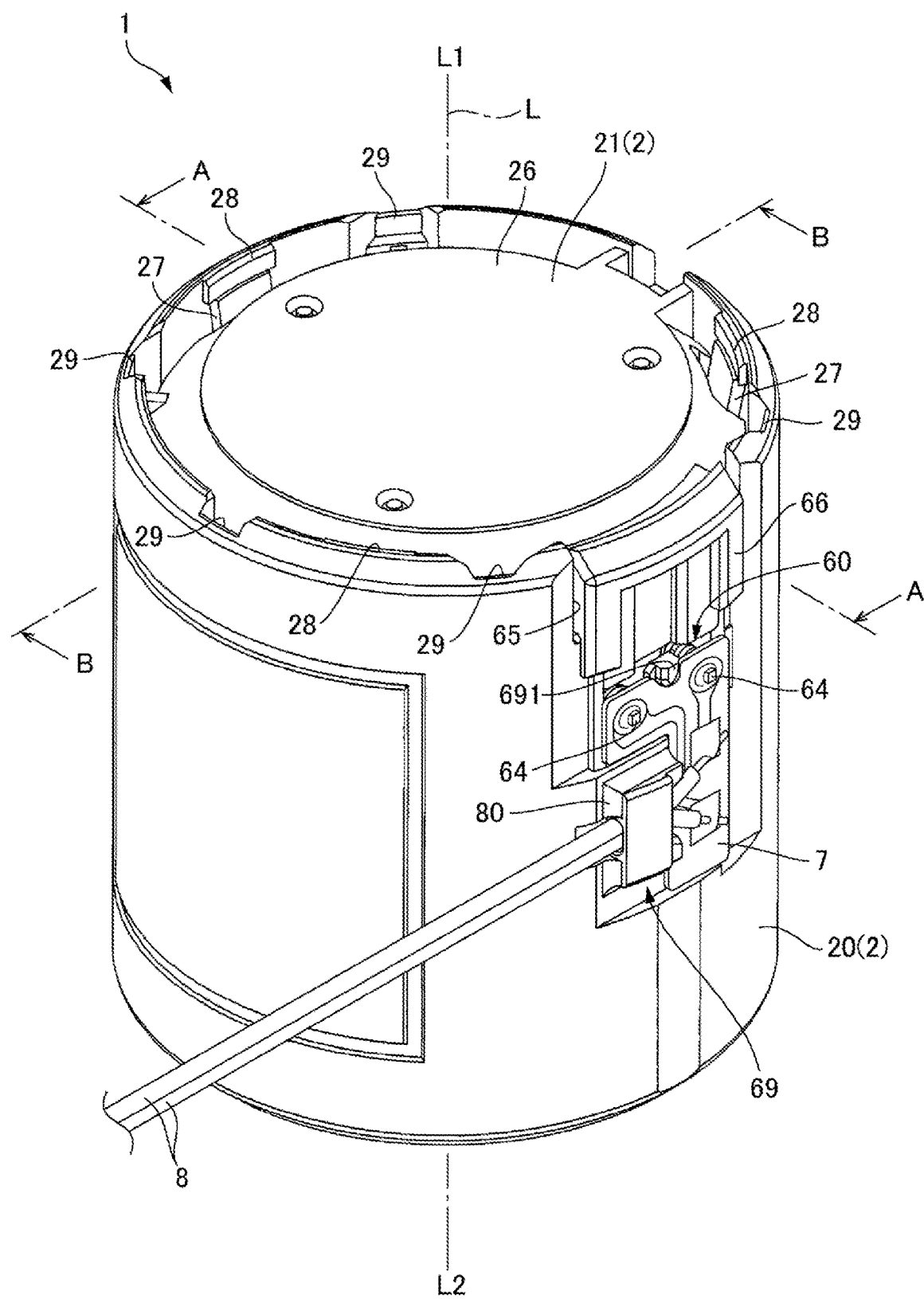
FIG. 1 is a perspective view of an actuator according to an embodiment of the present invention.

Now, at least one embodiment of the present invention is described with reference to the drawings. In embodiments described below, although a support body 2 is provided with a cylindrical case 20, as well as a movable body 3 is disposed inside the case 20 and oscillates in the axial direction with respect to the support body 2, in an actuator to which the at least an embodiment of the present invention is applied, the support body may have a rectangular parallelepiped shape as well as the movable body may oscillate in a longitudinal direction of the rectangular parallelepiped-shaped support body or in a direction orthogonal to the longitudinal direction of the rectangular parallelepiped-shaped support body.

Moreover, in the at least one embodiment described below, although a magnetic drive mechanism 6 to oscillate the movable body 3 with respect to the support body 2 includes a magnet 61 disposed on the movable body 3 and a coil 62 disposed on the support body 2, in the at least one embodiment of the present invention, a position of the magnet 61 and that of the coil 62 may be replaced with each other.

Namely, the magnetic drive mechanism 6 may be provided with the coil 62 disposed on the movable body 3 and the magnet 61 disposed on the support body 2.

[Entire Configuration]

Figure 2:
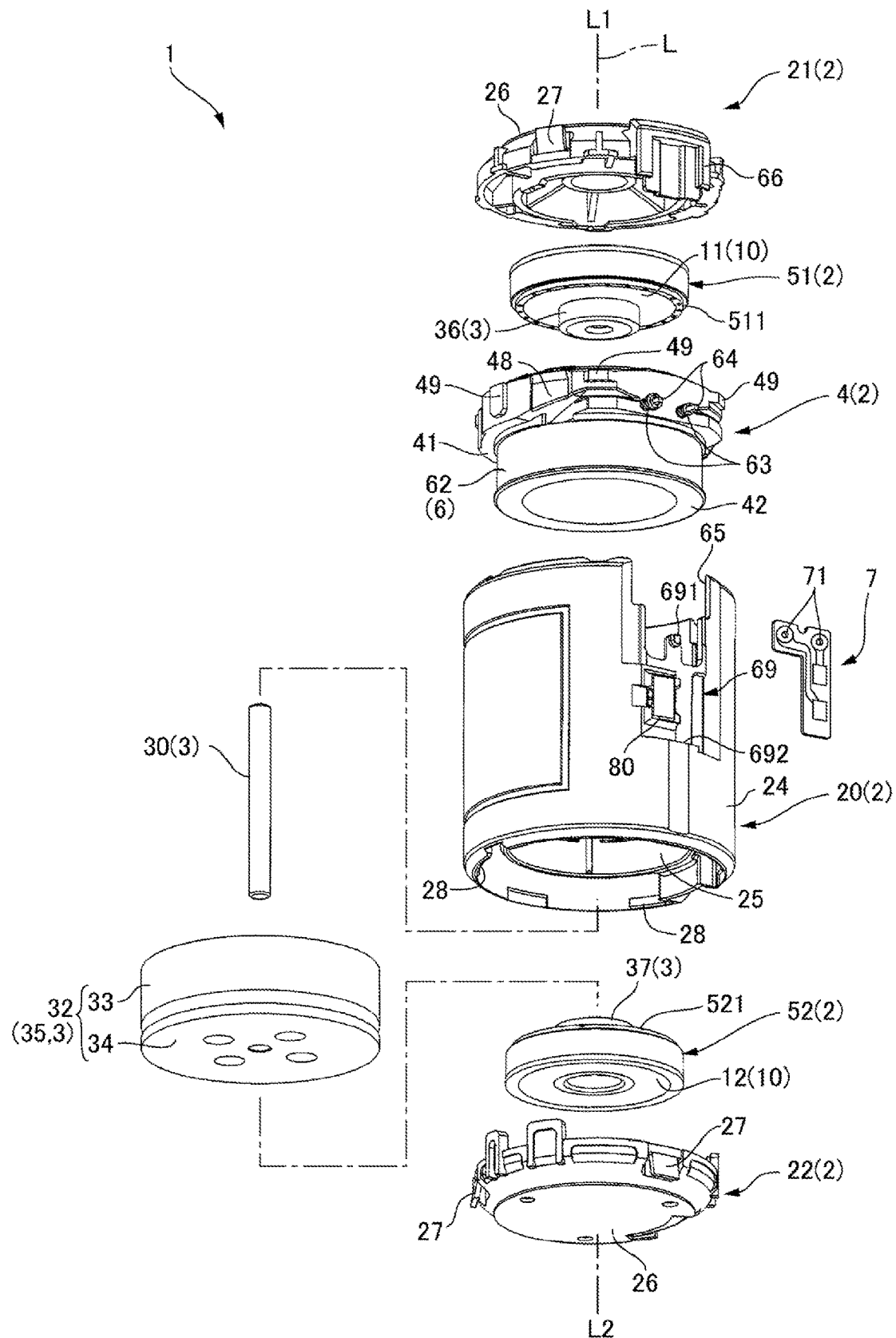
FIG. 2 is an exploded perspective view of the actuator shown in FIG. 1.
Figure 3:
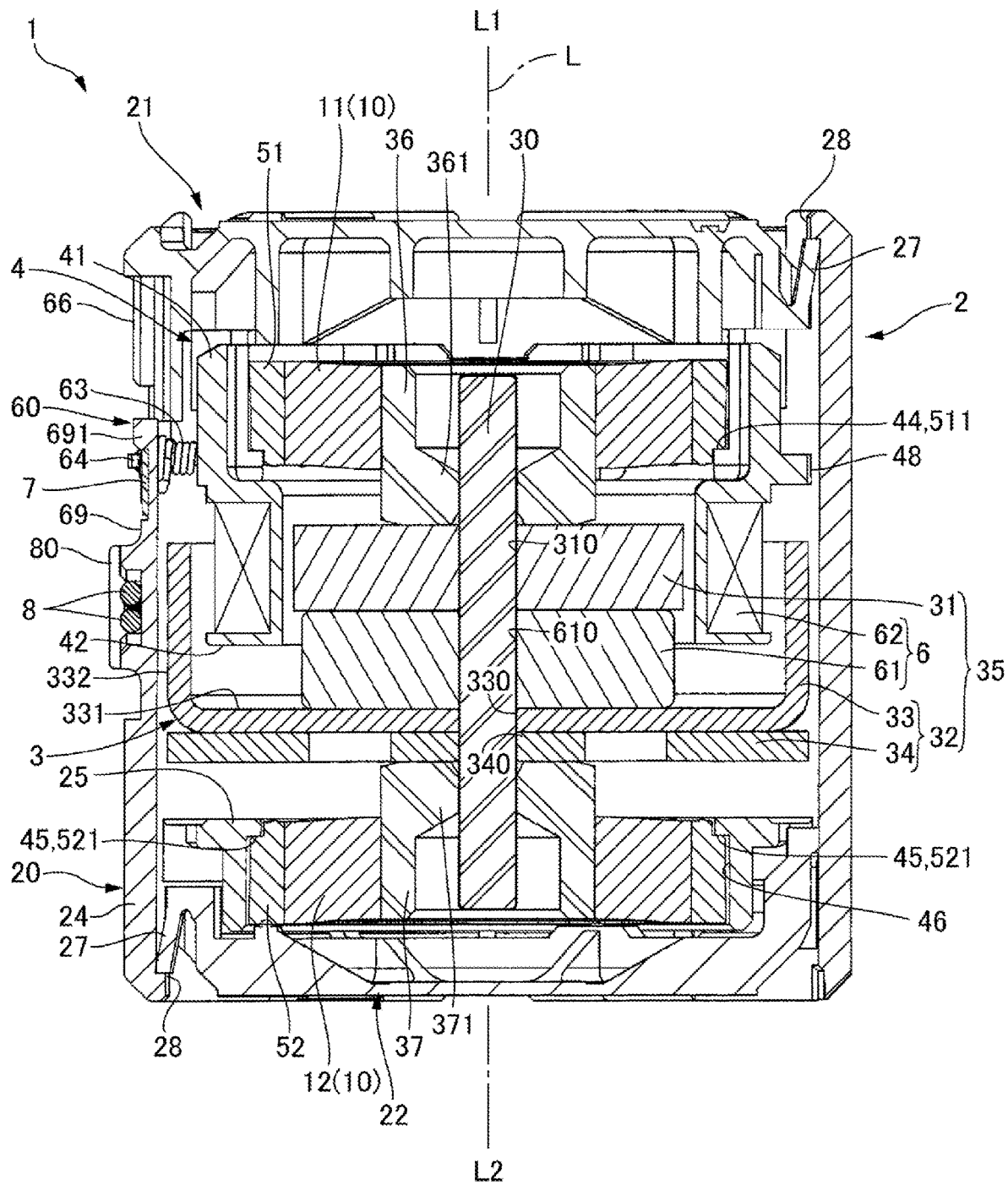
FIG. 3 is an A-A cross-sectional view of the actuator shown in FIG. 1.
Figure 4:
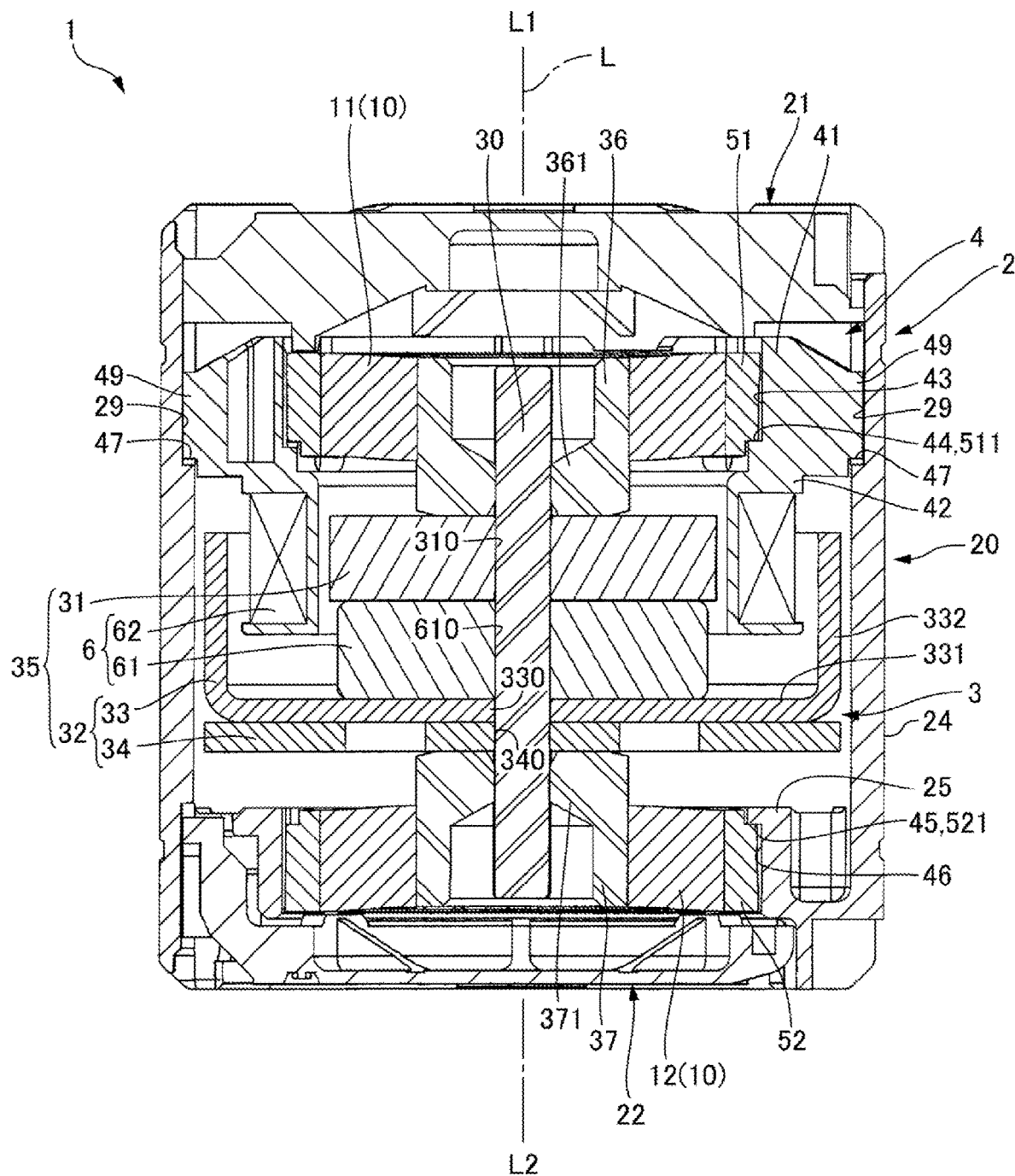
FIG. 4 is a B-B cross-sectional view of the actuator shown in FIG. 1 taken in a direction perpendicular to that of FIG. 3.

FIG. 1 is a perspective view of the actuator 1 according to an embodiment of the present invention. FIG. 2 is an exploded perspective view of the actuator 1 shown in FIG. 1. FIGS. 3 and 4 are cross-sectional views of the actuator 1 shown in FIG. 1. FIG. 3 is a cross-sectional view of the actuator 1 taken along an A-A position shown in FIG. 1. FIG. 4 is a cross-sectional view of the actuator 1 taken along a B-B position shown in FIG. 1 and in a direction perpendicular to that of FIG. 3. In the following description, an axial direction is defined as a direction in which a central axis L of a movable body 3 extends, a notation L1 is defined as one side of the axial direction, and a notation L2 is defined as the other side of the axial direction.

As shown in FIGS. 1 to 4, the actuator 1 includes the support body 2, the movable body 3, the connecting element 10 connected to the support body 2 and the movable body 3, and the magnetic drive mechanism 6 to relatively move the movable body 3 with respect to the support body 2. The connecting element 10 has at least one of elasticity and viscoelasticity. The magnetic drive mechanism 6 includes the magnet 61 disposed on the movable body 3 and the coil 62 disposed on the support body 2, and relatively moves the movable body 3 with respect to the support body 2 in the axis direction. As shown in FIGS. 3 and 4, the movable body 3 is connected to the support body 2 via each connecting elements 10 at an end of the L1 side that is one side of the axial direction and at an end of the L2 side that is the other side of the axial direction.

[Support Body]

As shown in FIGS. 2 to 4, the support body 2 includes a cylindrical case 20, a first lid member 21 to close an opening on the L1 side that is one side of the axial direction along an axial direction of the case 20, a second lid member 22 to close an opening on the L2 side that is the other side of the axial direction along the axial direction of the case 20, and a coil holder 4 disposed between the first lid member 21 and the second lid member 22 inwardly along the inner circumference of the case 20. In this embodiment, the case 20, the first lid member 21, the second lid member 22, and the coil holder 4 are made of resin. The support body 2 also include a first outer frame member 51 fitting inwardly along the inner circumference of the coil holder 4 and a second outer frame member 52 fitting inwardly along the inner circumference of the case 20 at a position spaced apart from the first outer frame member 51 to the L2 side that is the other side of the axial direction.

[Connecting Element]

The connecting element 10 includes an annular first connecting element 11 joined to an inner circumferential surface of the first outer frame member 51 and an annular second connecting element 12 joined to an inner circumferential surface of the second outer frame member 52. As described later, in this embodiment, the first connecting element 11 and the second connecting element 12 are gel-like members molded of a gel material, and are joined to the first outer frame member 51 and the second outer frame member 52, respectively by adhesiveness of each gel-like member itself.

[Coil Holder]

As shown in FIG. 2, the coil holder 4 includes an annular first outer frame member fixing portion 41 and a drum portion 42 projecting from the first outer frame member fixing portion 41 to the L2 side that is the other side of the axial direction, and a coil 62 is disposed to surround the drum portion 42. The ends of coil wires 63 drawn out from the coil 62 entwine two terminal pins 64 projecting radially outside from the first outer frame member fixing portion 41 of the coil holder 4. As shown in FIG. 1, the terminal pins 64 protrude outward from the case 20 and are connected to a wiring board 7.

As shown in FIG. 4, the coil holder 4 has a first step portion 44 for positioning the first outer frame member 51 in the axial direction. The first outer frame member fixing portion 41 surrounds an outer circumference of the first outer frame member 51. An inner circumferential surface of the first outer frame member fixing portion 41 has a first concave portion 43 recessed toward the L2 side that is the other side of the axial direction, and the first outer frame member 51 is press-fitted into the first concave portion 43. The first step portion 44 is provided at an end of the first concave portion 43 on the L2 side that is the other side of the axial direction along an axial direction of the first concave portion 43. In this embodiment, an annular step portion 511 formed on the outer circumferential surface of the first outer frame member 51 abuts the first step portion 44 in the axial direction.

[Case]

The case 20 has a cylindrical case body 24 and a second outer frame member fixing portion 25 disposed inwardly along the inner circumference of the case body 24. The second outer frame member fixing portion 25 is disposed at a position spaced apart from the coil holder 4 to the L2 side that is the other side of the axial direction. As shown in FIGS. 2 and 4, the second outer frame member fixing portion 25 protrudes inwardly along the inner circumference from the inner circumferential surface of the case body 24, and is integrally molded with the case body 24.

The case 20 has a second step portion 45 for positioning the second outer frame member 52 in the axial direction. As shown in FIGS. 3 and 4, the inner circumferential surface of the second outer frame member fixing portion 25 has a second concave portion 46 recessed toward the L1 side that is one side of the axial direction, and the second outer frame member 52 is press-fitted into the second concave portion 46. The second step portion 45 is provided at an end of the second concave portion 46 on the L1 side that is one side of the axial direction along an axial direction of the second concave portion 46. In this embodiment, an annular step portion 521 formed on the outer circumferential surface of the second outer frame member 52 abuts the second step portion 45 in the axial direction.

The case 20 has a third step portion 47 for positioning the coil holder 4 in the axial direction. As shown in FIG. 4, the third step portion 47 is formed on the inner circumferential surface of the case body 24. As shown in FIGS. 1 and 4, on the inner circumferential surface of the case body 24 into which the coil holder 4 fits, a plurality of groove portions 29 each extending in the axial direction are formed, and the third step portion 47 is formed at the end of the L2 side that is the other side of the axial direction along an axial direction of each groove portion 29. As shown in FIG. 2, the coil holder 4 has a plurality of convex elements 49 projecting from the outer circumferential surface of the first outer frame member fixing portion 41. When assembling the support body 2, convex elements 49 of the coil holder 4 are respectively fitted into groove portions 29 of the case body 24 from the L1 side that is one side of the axial direction and abut the third step portion 47 in the axial direction. This allows the coil holder 4 to be press-fitted and fixed to the case body 24, and positioned in the axial direction.

[Lid Member]

As shown in FIGS. 3 and 4, the first lid member 21 is fixed to the case body 24 from the L1 side that is one side of the axial direction along an axial direction of the first outer frame member fixing portion 41 provided in the coil holder 4. The second lid member 22 is also fixed to the case body 24 from the L2 side that is the other side of the axial direction along an axis direction of the second outer frame member fixing portion 25. As shown in FIG. 2, viewing from the axial direction, each of the first lid member 21 and the second lid member 22 has a circular lid portion 26 and a plurality of lock elements 27 arranged on an outer circumferential edge of the lid portion 26 at equal intervals along the circumference surface thereof. In this embodiment, the first lid member 21 and the second lid member 22 each have three lock elements 27. The lock element 27 is a claw portion which extends outwardly along the outer circumference from the lid portion 26 so as to incline with respect to the axial direction.

The lock element 27 elastically deforms in the radial direction so as to be pushed inwardly along the inner circumference of the case body 24 together with the lid portion 26. The case 20 has a restriction element 28 to restrict the lock element 27 from coming off from the inside of the case 20. The restriction element 28 is a convex element projecting inwardly along the inner circumference from the edge of the case body 24.

As shown in FIGS. 1 and 2, three restriction elements 28 are arranged at equal intervals each at the ends of the L1 side that is one side of the axial direction and the L2 side that is the other side of the axial direction, which is along the axial direction of the case body 24. The restriction element 28 abuts a tip of the lock element 27 in the axial direction. The first lid member 21 is fixed to the case 20 by means of a combination of a locking structure consisting of the lock element 27 and the restriction element 28, and bonding by an adhesive.

As shown in FIG. 2, the first outer frame member fixing portion 41 of the coil holder 4 has groove portions 48 in which portions overlapping the three restriction elements 28 provided on the case body 24 in the axial direction are cut out inwardly along the inner circumference. Thereby, when inserting the coil holder 4 into the case body 24, interference between the first outer frame member fixing portion 41 and the restriction element 28 can be avoided. The first lid member 21 is fixed to the case 20 by means of a combination of a locking structure consisting of the lock element 27 and the restriction element 28, and bonding by an adhesive.

[Wiring Lead-Out Portion]

As shown in FIGS. 1 and 3, the support body 2 includes a wiring lead-out portion 60 for leading out the terminal pins 64 with which the coil wires 63 are entwined, which are drawn out from the coil 62 of the magnetic drive mechanism 6.

The wiring lead-out portion 60 is a gap between a notch portion 65 (see FIG. 2), in which an edge of the L1 side that is one side of the axial direction of the case 20 is cut out toward the L2 side that is the other side L2 of the axial direction, and a cover 66 extending from a part of the outer peripheral edge of the first lid member 21 to the L2 side that is the other side of the axial direction.

The case 20 has a board fixing portion 69 formed on the other side L2 of the notch portion 65. The wiring board 7 is fixed to the board fixing portion 69 by means of a combination of a locking structure including the claw element 691 which is provided at an end of the board fixing portion 69 on the L1 side that is one side of the axial direction and an engaging groove 692 which is provided at an end of the board fixing portion 69 on the L2 side that is the other side of the axial direction, and bonding by an adhesive. A lead wire 8 for supplying power to the coil 62 is connected to the wiring board 7. The board fixing portion 69 has a lead wire holding part 80 which holds the lead wire 8 at a position adjacent to the wiring board 7 along the outer circumference surface.

The first outer frame member fixing portion 41 of the coil holder 4 is disposed inwardly along the inner circumference of the notch portion 65.

A root portion of each of two terminal pins 64 which extends from the first outer frame member fixing portion 41 to the outside of the outer circumference is entwined with the coil wire 63 drawn out from the coil 62. The terminal pins 64 are passed through two holes 71 (see FIG. 2) provided in the wiring board 7 which is fixed to the board fixing portion 69, and are electrically connected to lands provided on the edges of the holes 71.

[Movable Body]

As shown in FIGS. 2 to 4, the movable body 3 has a shaft 30 extending in the axial direction at the radial center of the support body 2. The magnet 61 and a yoke 35 are fixed to the shaft 30 by a cylindrical first inner frame member 36 and a cylindrical second inner frame member 37. The shaft 30 is a round bar made of metal. The first inner frame member 36 and the second inner frame member 37 are cylindrical bodies which are made of metal, and the first inner frame member 36 and the second inner frame member 37 have circular through holes.

As shown in FIGS. 3 and 4, the inner circumferential surface of the first inner frame member 36 has an annular protrusion portion 361 projecting inwardly along the radial direction at the end of the L2 side that is the other side of the axial direction. Accordingly, when the first inner frame member 36 is press-fitted into the shaft 30, the shaft 30 is press-fitted into the annular protrusion portion 361. Furthermore, the inner circumferential surface of the second inner frame member 37 has an annular protrusion portion 371 projecting inwardly along the radial direction at the end of the L1 side that is one side of the axial direction. Accordingly, when the second inner frame member 37 is press-fitted into the shaft 30, the shaft 30 is press-fitted into the annular protrusion portion 371.

The magnet 61 has a shaft hole 610 through which the shaft 30 penetrates, so that the magnet 61 is fixed at a substantial center of the shaft 30 in the axial direction. The yoke 35 includes a first yoke 31 overlapping the magnet 61 on the L1 side that is one side of the axial direction and a second yoke 32 overlapping the magnet 61 on the L2 side that is the other side of the axial direction. The first yoke 31 has a disc-like shape with a shaft hole 310 the shaft 30 penetrates. The second yoke 32 consists of two members, that is, a cup-like first magnetic member 33 and a disc-like second magnetic member 34. The first magnetic member 33 has a circular end plate portion 331 in which a shaft hole 330 the shaft 30 penetrates is provided, and a cylindrical portion 332 extending from a peripheral edge of the end plate portion 331 to the L1 side that is one side of the axial direction. In this embodiment, the end plate portion 331 of the first magnetic member 33 is fixed to the end surface of the magnet 61 on the L2 side that is the other side of the axial direction. The second magnetic member 34 has a shaft hole 340 the support shaft 30 penetrates, and is fixed to an end surface of the end plate portion 331 of the first magnetic member 33, which is an opposite side surface with respect to the magnet 61.

In the movable body 3, while the shaft 30 penetrates the shaft holes 310, 610, 330, and 340 of members constituting the magnet 61 and the yoke 35, the first inner frame member 36 and the second inner frame member 37 are fixed to the shaft 30 at the side of the yoke 35 and at the side of the magnet 61 in the axial direction, respectively. As a result, the first inner frame member 36 supports the magnet 61 and the yoke 35 from the L1 side that is one side of the axial direction, as well as the second inner frame member 37 supports the magnet 61 and the yoke 35 from the L2 side that is the other side of the axial direction, so that the magnet 61 and the yoke 35 are fixed to the support shaft 30.

In the second yoke 32, an inner diameter of the cylindrical portion 332 of the first magnetic member 33 is larger than an outer diameter of the magnet 61 and the first yoke 31. Accordingly, when the magnet 61 and the first yoke 31 are stacked on the circular end plate portion 331, which is a bottom of the cylindrical portion 332, the cylindrical portion 332 faces the outer circumferential surface of the magnet 61 and the outer circumferential surface of the first yoke 31 at a position separated radially outward from the outer circumferential surface of the magnet 61 and the outer circumferential surface of the first yoke 31. In this embodiment, a part of the coil 62 is disposed between the cylindrical portion 332 and the outer circumferential surface of the magnet 61. In addition, a part of the coil 62 is disposed between the cylindrical portion 332 and the outer circumferential surface of the first yoke 31.

[Method of Manufacturing the Connecting Element]

The first connecting element 11 and the second connecting element 12 are made of a viscoelastic member. For example, as the first and second connecting elements 11 and 12, it is possible to employ gel-like materials consisting of silicone gel or the like, various rubber materials such as natural rubber, diene-based rubber (e.g., styrene-butadiene rubber, isoprene rubber, butadiene rubber, chloroprene rubber, acrylonitrile butadiene rubber, etc.), non-diene-based rubber (e.g. butyl rubber, ethylene-propylene rubber, ethylene-propylene-diene rubber, urethane rubber, silicone rubber, fluororubber, etc.), thermoplastic elastomers, and the like, and modified materials thereof. In this embodiment, the first and second connecting elements 11 and 12 are made of a silicone gel having a penetration degree of 90 to 110.

The first connecting element 11 and the second connecting element 12 are manufactured in a way that fills gel material into a mold and then solidifies it (i.e., casting). The molding of the first connecting element 11 includes coaxially positioning the first outer frame member 51 and the first inner frame member 36 with a jig to form an annular gap between the first outer frame member 51 and the first inner frame member 36, filling the gap with a gel material, and curing the same by heating. As a result, the first connecting element 11 is joined to the inner circumferential surface of the first outer frame member 51 as well as the outer circumferential surface of the first inner frame member 36 by the adhesiveness of the gel-like member itself. Prior to filling the gap with the gel material, an adhesion promoter such as a primer may be applied to the inner circumferential surface of the first outer frame member 51 and the outer circumferential surface of the first inner frame member 36 in order to increase a joint strength. Similarly, the molding of the second connection element 12 includes forming an annular gap between the second outer frame member 52 and the second inner frame member 37, filling the gap with the gel material, and curing the same by heating. Accordingly, it is possible to assemble the actuator 1 by connecting the support body 2 and the movable body 3 without a process of adhering the gel-like member.

The first connecting element 11 and the second connecting element 12 are gel-like members made from a two-liquid gel material in which two raw materials (i.e., a first material and a second material) are compounded in a predetermined compounding ratio. The first material is a main agent which contains a base oil and a catalyst. The main agent may contain materials other than the base oil and the catalyst. The second material is a curing agent which contains the base oil and a crosslinking agent.

The curing agent may contain materials other than the base oil and the crosslinking agent. Spring constants of the first connecting element 11 and the second connecting element 12 change depending on the compounding ratio of the first material and the second material and a volume of the compound (i.e., a filling amount of the gel material). Accordingly, the compounding ratio of the first material and the second material as well as the filling amount of the gel material are determined so that a vibration characteristic (i.e., a relationship between a resonance frequency and a peak value of an acceleration) of the actuator 1 meets a target value.

A manufacturing process of the first connecting element 11 and the second connecting element 12 (gel-like member) includes weighing the first material and the second material based on the predetermined compounding ratio, and stirring and mixing the first material and the second material in a mixer. The manufacturing process further includes putting the stirred gel material into a syringe to defoam it, setting the syringe in a dispenser, and dispensing a constant amount of the gel material at a time. Thereby, the dispensed constant amount of the gel material is filled into the gap between the first inner frame member 36 and the first outer frame member 51 and the gap between the second inner frame member 37 and the second outer frame member 52.

[Temperature Characteristic of the Connecting Element]

Figure 5:
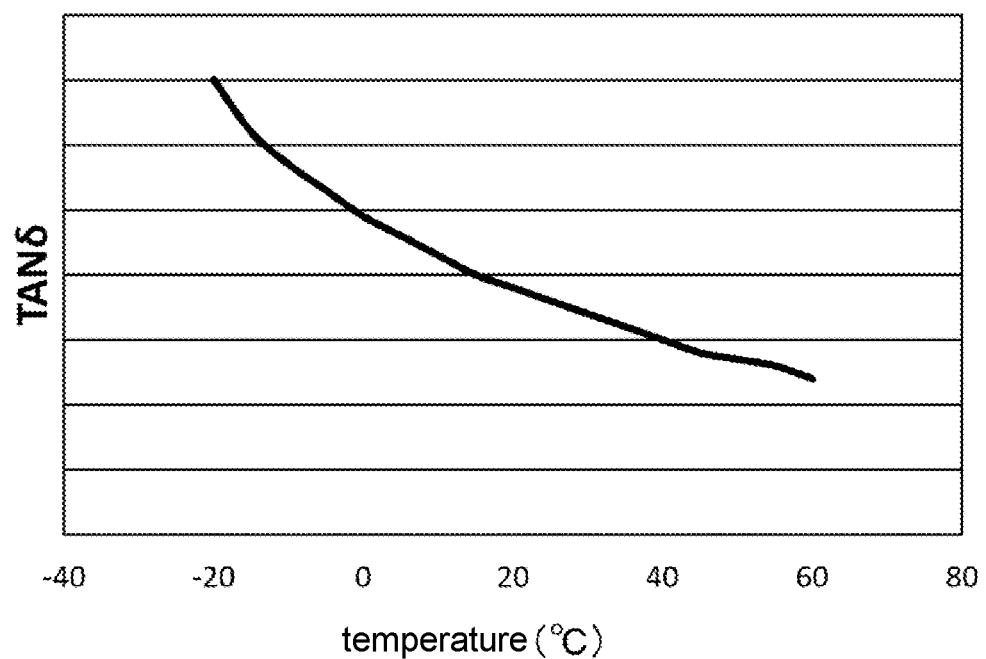
FIG. 5 is a graph showing a temperature characteristic of a connecting element.

FIG. 5 is a graph showing the temperature characteristic of the connecting element 10, in which a loss tangent (Tan δ) of the gel-like member measured by a dynamic viscoelasticity measurement varies over the temperature. As shown in FIG. 5, in this embodiment, the gel-like member (e.g., silicone gel) used as the first connecting element 11 and the second connecting element 12 decreases in Tan δ as the temperature rises. The closer to zero the value of Tan δ is, the closer to an elastic member a viscoelastic member becomes, and the larger the value of Tan δ is, the closer to a viscous member the viscoelastic member becomes. In the actuator 1 according to this embodiment, as the temperature rises, the value of Tan δ of the first connecting element 11 and the value of Tan δ of the second connecting element 12 decrease, and the elasticity contributes to the temperature characteristic more than the viscosity. As a result, since an attenuation of the oscillation of the movable body 3 becomes small, the acceleration of the movable body 3 increases.

Figure 6:
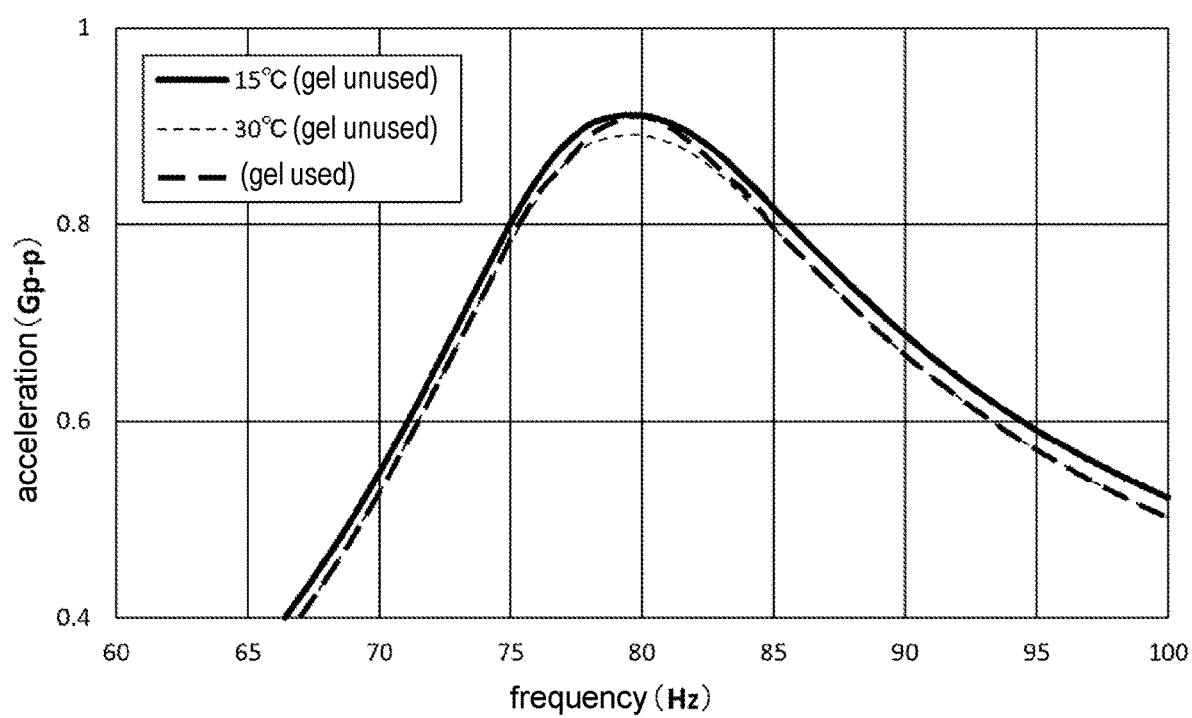
FIG. 6 is a graph showing a variety of acceleration-frequency characteristics of a movable body for a connecting element with a variety of temperature characteristics.

FIG. 6 is a graph showing a variety of acceleration-frequency characteristics of the movable body 3 for the connecting element 10 with a variety of temperature characteristics. In FIG. 6, the notation "gel used" indicates data of the acceleration-frequency characteristic of the actuator 1 according to this embodiment, in the case where the connecting element 10 whose Tan δ decreases as the temperature rises is employed. Furthermore, the notation "gel unused" indicates data of the acceleration-frequency characteristic of the actuator as a comparative example, in the case where the connecting element, whose Tan δ is unchanged even if the temperature changes, is employed. In the comparative examples, the notations "15° C." and "30° C." are temperature conditions of both the coil and the connecting element.

As shown in FIG. 6, in the actuator of the comparative examples, since the current flowing through the coil changes depending on the temperature conditions, the acceleration (i.e., a peak value of the acceleration) at a resonance frequency changes if the temperature conditions vary. Specifically, since the current flowing through the coil decreases as the temperature rises, the peak value of the acceleration under the temperature condition at 30° C. is lower than that under the temperature condition at 15° C.

In the actuator 1 according to this embodiment, the gel-like member used as the connecting element 10 is selected so that the connecting element 10 has the following temperature characteristic. Namely, in the actuator 1 according to this embodiment, the decrease in the peak value of the acceleration of the movable body 3, which is caused by the decrease in the current flowing through the coil 62, is cancelled by the increase in the peak value of the acceleration of the movable body 3, which is caused by the decrease in the Tan δ of the connecting element 10 (i.e., gel-like member). Therefore, as shown in FIG. 6, in the actuator 1 according to this embodiment, the peak value of the acceleration of the movable body 3 does not decrease due to a change of the temperature conditions. As a result, a constant vibration can be produced even if the temperature condition varies.

[Operation of the Actuator]

In the actuator 1, the magnetic drive mechanism 6 generates driving force to drive the movable body 3 in the axial direction by energizing the coil 62. When the coil 62 is deenergized, the movable body 3 returns to an origin position by return force of the connecting element 10. Consequently, the movable body 3 oscillates in the axis direction by intermittently energizing the coil 62. Furthermore, it is possible to adjust the AC waveform applied to the coil 62 such that an acceleration with which the movable body 3 moves to the L1 side that is one side of the axial direction is different from an acceleration with which the movable body 3 moves to the L2 side that is the other side of the axial direction. Therefore, a user who holds a tactile device to which the actuator 1 is attached can get a bodily sensible vibration with an orientation in the axial direction. The actuator 1 can also be used to constitute an audio speaker.

In this embodiment, the connecting element 10 is located at a position where the support body 2 and the movable body 3 face with each other in the first direction (i.e., a radial direction), and the movable body 3 oscillates in the second direction (i.e., an axial direction) which is orthogonal to the first direction (i.e., a radial direction). When the movable body 3 oscillates in the second direction (i.e., the axial direction) with respect to the support body 2, the first connecting element 11 and the second connecting element 12 deform in the shearing direction by following the oscillation of the movable body 3. The gel-like materials such as silicone gel have linear or nonlinear stretchability characteristics depending on the directions of expansion and contraction. When the gel-like material deforms in the shearing direction, a linear component of the gel-like material has larger deformation characteristic than a nonlinear component thereof. Accordingly, when the movable body 3 oscillates in the axial direction with respect to the support body 2, since the first connecting element 11 and the second connecting element 12 deform within a range of a high linearity, the improved vibration characteristics with a good linearity can be obtained.

When the movable body 3 moves in the radial direction, the first and second connecting elements 11 and 12 are deformed in a collapsing direction. Here, a spring constant with which the gel-like member is deformed in the collapsing direction is around three times a spring constant with which the gel-like member is deformed in the shearing direction. As a result, it is possible to suppress the movement of the movable body 3 in a direction different from the oscillation direction (i.e., the axial direction) as well as collision between the movable body 3 and the support body 2.

The Main Effect of this Embodiment

As described above, an actuator 1 according to the present embodiment includes: a support body 2 and a movable body 3; a connecting element 10 connected to the support body 2 and the movable body 3; and a magnetic drive mechanism 6 including a magnet 61 and a coil 62, to cause the movable body 3 to relatively move with respect to the support body 2. The connecting element 10 is a viscoelastic member. Provided that Tan δ is a loss tangent of the viscoelastic member measured by a dynamic viscoelasticity measurement, the Tan δ of the connecting element 10 (i.e., the viscoelastic member) decreases as a temperature rises.

In this embodiment, a viscoelastic material having a temperature characteristic that the loss tangent (Tan δ) thereof decreases as the temperature rises is used as the connecting element 10 which connects the movable body 3 and the support body 2. Accordingly, while the current flowing through the coil 62 decreases due to a temperature rising of the coil 62 as well as the peak value of the acceleration at the resonance frequency decreases, the decrease in the peak value of the acceleration is suppressed in accordance with the temperature characteristic of the connecting element 10 (the decrease in Tan δ as a temperature rises). Accordingly, since a change in the acceleration of the movable body 3 due to the temperature change can be suppressed, a change in the oscillation of the movable body 3 due to the temperature change can be suppressed.

In this embodiment, when the movable body 3 oscillates at a resonance frequency, the viscoelastic member used as the connecting element 10 is selected such that the decrease in the peak value of the acceleration of the movable body 3, that is caused by the decrease in a current flowing through the coil 62, is cancelled by the increase in the peak value, that is caused by the decrease in the Tan δ of the connecting element 10 (i.e., the viscoelastic member). Therefore, even if the temperature changes, the acceleration of the movable body 3 is unchanged and the oscillation of the movable body 3 is unchanged.

In this embodiment, a silicone gel is selected as the viscoelastic member in order to be used as the connecting element 10. The silicone gel has a temperature characteristic that the loss tangent (Tan δ) thereof, which is measured by dynamic viscoelasticity, decreases as the temperature rises. Accordingly, as shown in FIG. 6, it is possible to configure the embodiment such that the decrease in the peak value of the acceleration of the movable body 3, that is caused by the decrease in a current flowing through the coil 62, is cancelled by the increase in the acceleration of the movable body 3, that is caused by the decrease in the Tan δ of the connecting element 10. Therefore, it is possible to provide the actuator 1 in which the oscillation of the movable body 3 is unchanged due to the temperature changing.

ALTERNATIVE EXAMPLES

In the above, although the connecting element 10 is a gel-like member such as a silicone gel, a viscoelastic member that can be used as the connecting element 10 is not limited to the silicone gel. Namely, any viscoelastic member may be used as long as its Tan δ decreases as the temperature rises. Furthermore, the viscoelastic member used as the connecting element 10 is not limited to a member made of one type of material, but may be a composite member combining a gel-like member, rubber, or a modified material thereof, and an elastic material such as a spring.

What is claimed is:

1. An actuator comprising:
   a support body and a movable body;
   a connecting element connected to the support body and the movable body; and
   a magnetic drive mechanism comprising a magnet and a coil, to cause the movable body to relatively move with respect to the support body,
   wherein the connecting element is a viscoelastic member, and
   provided that Tanδ is a loss tangent of the viscoelastic member measured by a dynamic viscoelasticity measurement, the Tan δ of the viscoelastic member decreases as a temperature rises;
   wherein when the movable body oscillates at a resonance frequency,
   a decrease in a peak value of an acceleration of the movable body, that is caused by a decrease in a current flowing through the coil, is cancelled by an increase in the peak value, that is caused by a decrease in the Tan δ of the viscoelastic member.

2. The actuator according to claim 1, wherein the viscoelastic member is a silicone gel.

3. The actuator according to claim 1, wherein the connecting element is disposed at a position where the support body and the movable body face each other in a first direction, and
   the movable body oscillates in a second direction that intersects the first direction.

* * * * *